(12) United States Patent
Oh et al.

(10) Patent No.: US 9,067,514 B2
(45) Date of Patent: Jun. 30, 2015

(54) SEAT TRACK

(75) Inventors: Bum Suk Oh, Incheon (KR); Young Jin Park, Cheonan-si (KR); Hoon Kim, Cheonan-si (KR)

(73) Assignee: Austem Co., Ltd., Cheonan-si (KR)

( * ) Notice: Subject to any disclaimer, the term of this patent is extended or adjusted under 35 U.S.C. 154(b) by 0 days.

(21) Appl. No.: 14/111,867

(22) PCT Filed: Nov. 23, 2011

(86) PCT No.: PCT/KR2011/008945
§ 371 (c)(1),
(2), (4) Date: Oct. 15, 2013

(87) PCT Pub. No.: WO2012/144710
PCT Pub. Date: Oct. 26, 2012

(65) Prior Publication Data
US 2014/0224954 A1 Aug. 14, 2014

(30) Foreign Application Priority Data

Apr. 21, 2011 (KR) .......................... 10-2011-0037030

(51) Int. Cl.
*F16M 13/00* (2006.01)
*B60N 2/08* (2006.01)
*B60N 2/07* (2006.01)

(52) U.S. Cl.
CPC ............ *B60N 2/0806* (2013.01); *B60N 2/0705* (2013.01); *B60N 2/0818* (2013.01); *B60N 2/0843* (2013.01); *B60N 2/07* (2013.01); *B60N 2/0715* (2013.01)

(58) Field of Classification Search
CPC .............................. B60N 2/0727; F16M 13/00
USPC ........................................... 248/429, 430, 424
See application file for complete search history.

(56) References Cited

U.S. PATENT DOCUMENTS 5,918,846 A * 7/1999 Garrido ......................... 248/429
6,354,553 B1 * 3/2002 Lagerweij et al. ............ 248/430
(Continued)

FOREIGN PATENT DOCUMENTS

JP 2005007982 A 1/2005
JP 2009286235 A 12/2009
(Continued)

Primary Examiner — Amy Sterling
(74) Attorney, Agent, or Firm — Schmeiser, Olsen & Watts LLP

(57) ABSTRACT

The present invention relates to a seat track comprising a fixed rail of a channel structure having laterally inner walls which extend vertically and have recesses; a moving rail sliding along the fixed rail and having laterally vertical walls which face the inner walls of the fixed rail and have a plurality of through holes; and a locking member having a supporting body received and installed between the vertical walls of the moving rail to face a plurality of the through holes, a plurality of rotating pins supported by the supporting body and rotating between a locking position where a plurality of the rotating pins are inserted in the recesses of the fixed rail through the through holes and an unlocking position where a plurality of the rotating pins are separated from the recesses, a guide spring supported by the supporting body and pressing a plurality of the rotating pins to rotate toward the unlocking position, and an unlocking body sliding along the supporting body due to an outer force to press a plurality of the rotating pins to rotate from the locking position to the unlocking position. Therefore, miniaturization and performance improvement can be accomplished compared to conventional technology.

6 Claims, 7 Drawing Sheets

(56) References Cited

U.S. PATENT DOCUMENTS

| | | | |
|---|---|---|---|
| 6,869,057 B2 * | 3/2005 | Matsumoto et al. | 248/430 |
| 7,735,798 B2 * | 6/2010 | Kojima | 248/429 |
| 8,033,520 B2 * | 10/2011 | Fujieda et al. | 248/430 |
| 8,215,602 B2 * | 7/2012 | Walter et al. | 248/424 |
| 8,573,698 B2 * | 11/2013 | Wojatzki et al. | 297/344.1 |

FOREIGN PATENT DOCUMENTS

| | | |
|---|---|---|
| KR | 1020020032226 A | 5/2002 |
| KR | 1020100107091 A | 10/2010 |

* cited by examiner

SEAT TRACK

TECHNICAL FIELD

The present invention relates to a seat track which is installed for adjusting longitudinal position of a vehicle seat.

BACKGROUND ART

To meet a recent trend of a slimmer and lighter vehicle, the seat track is also required to pursue a lighter weight while its performance is the same as or better than before.

In this regard, the inventors of this application have introduced a seat track of so-called insert type where locking means for locking between an upper rail and a lower rail are inserted in the upper rail as can be seen in Korean patent registration No. 10-0848004 "SEAT MOVING TRACK DEVICE" (registration date: Jul. 16, 2008) (hereinafter referred to as 'Korean patent').

The Korean patent shows a structure where the locking between the upper rail and the lower rail is made through a number of protrusions formed at a rotating locking member.

On the other hand, U.S. Pat. No. 7,207,541 "LOCKING DEVICE WITH SEVERAL LOCKING PINS" (registration date: Apr. 24, 2007) (hereinafter referred to as 'US patent') shows a mechanism where locking protrusions of a locking member are operated separately therebetween.

In the US patent, a structure is shown where the locking is made by a number of sliding locking pins inserted into the lower rail through the upper rail.

In this invention, a seat track of an improved type is introduced which accomplishes slimmer product and performance improvement with a comprehensive study of the conventional seat tracks including the Korean patent and the US patent.

DISCLOSURE

Technical Problem

The object of the present invention is to provide a seat track of an enhanced type compared to conventional technology in order to accomplish a miniaturization and performance improvement at the same time.

Technical Solution

In order to accomplish the above object, the present invention provides a seat track comprising a fixed rail of a channel structure having laterally inner walls which extend vertically and have recesses with a predetermined interval in a longitudinal direction; a moving rail sliding along the fixed rail and having laterally vertical walls which face the inner walls of the fixed rail and have a plurality of through holes with a predetermined interval in the longitudinal direction; and a locking member having a supporting body received and installed between the vertical walls of the moving rail to face a plurality of the through holes, a plurality of rotating pins supported by the supporting body and rotating between a locking position where a plurality of the rotating pins are inserted in the recesses of the fixed rail through the through holes and an unlocking position where a plurality of the rotating pins are separated from the recesses, a guide spring supported by the supporting body and pressing a plurality of the rotating pins to rotate toward the unlocking position, and an unlocking body sliding along the supporting body due to an outer force to press a plurality of the rotating pins to rotate from the locking position to the unlocking position.

According to an aspect of the present invention, a plurality of the rotating pins are provided as a pair at both lateral sides and supported by the supporting body to rotate in the opposite directions therebetween, and also provided to be inserted into the recesses of the inner walls of the fixed rail through the through holes of the vertical walls of the moving rail.

According to an aspect of the present invention, a plurality of the rotating pins which are provided as a pair at both lateral sides are penetrated and supported to rotate by a pair of hinge shaft inserted in the supporting body in the longitudinal direction.

According to an aspect of the present invention, the unlocking body has a plurality of push arms in a pair at both lateral sides to correspond to each of a plurality of the rotating pins, and the supporting body has a plurality of guiding recesses at both lateral sides to guide the slide of a plurality of the push arms.

According to an aspect of the present invention, the unlocking body has a surface plate received between the vertical walls of the moving rail as well as above the supporting body and integrally formed with a plurality of the push arms, and an input pin mounted on the surface plate to protrude to an outside through an upper surface of the moving rail.

According to an aspect of the present invention, a plurality of the rotating pins are arrayed alternately along the longitudinal direction of the supporting body therebetween at both lateral sides, and the supporting body has a plurality of chamber walls to receive a plurality of the rotating pins per two rotating pins from different lateral sides therebetween in the longitudinal direction.

According to an aspect of the present invention, the guide spring has a guide body of a stripe shape extending along a side surface of the supporting body, and a plurality of spring arms extending from the guide body to press a plurality of the rotating pins respectively.

Advantageous Effects

According to the seat track of the present invention as described above, the miniaturization of the product can be accomplished by the locking member inserted into the moving rail. Also, an enhanced locking performance of the seat track can be accomplished by the locking mechanism distinguished from that of the conventional technology where the locking between the moving rail and the fixed rail is made by the rotation of a number of rotating pins.

BEST MODE

Figure 1:
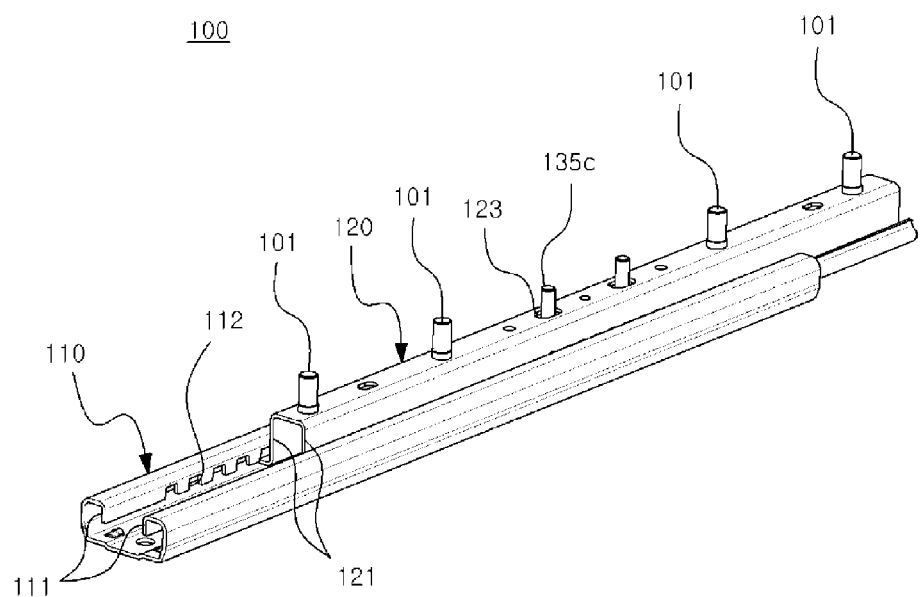
FIG. 1 is a perspective view of a seat track according to an exemplary embodiment of the present invention.
Figure 2:
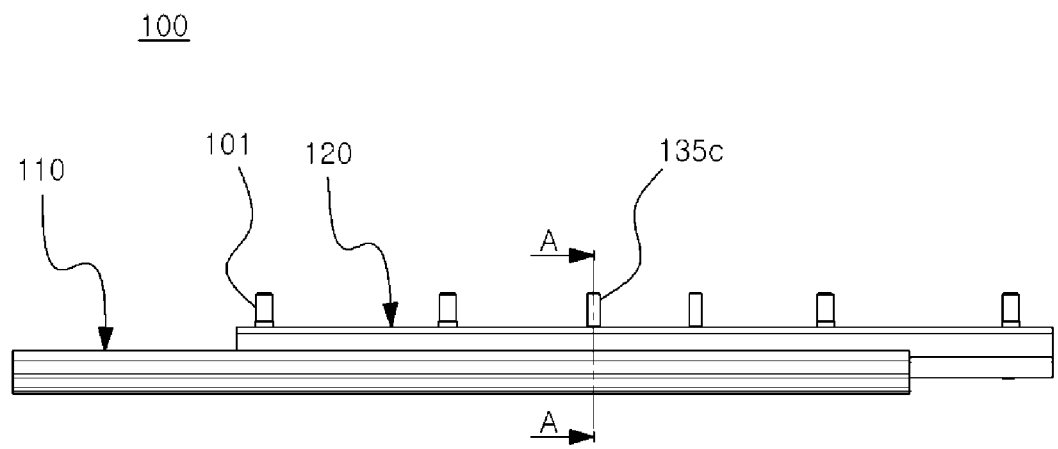
FIG. 2 is a side view of the seat track of FIG. 1.

As shown in FIG. 1 and FIG. 2, the seat track 100 according to the exemplary embodiment of the present invention comprises a fixed rail 110 fixed to a vehicle body and having a channel structure, and a moving rail 120 fixed to a seat through a combining bolt 101 and located at an inner side of the fixed rail 110 to slide longitudinally along the fixed rail 110.

Figure 3:
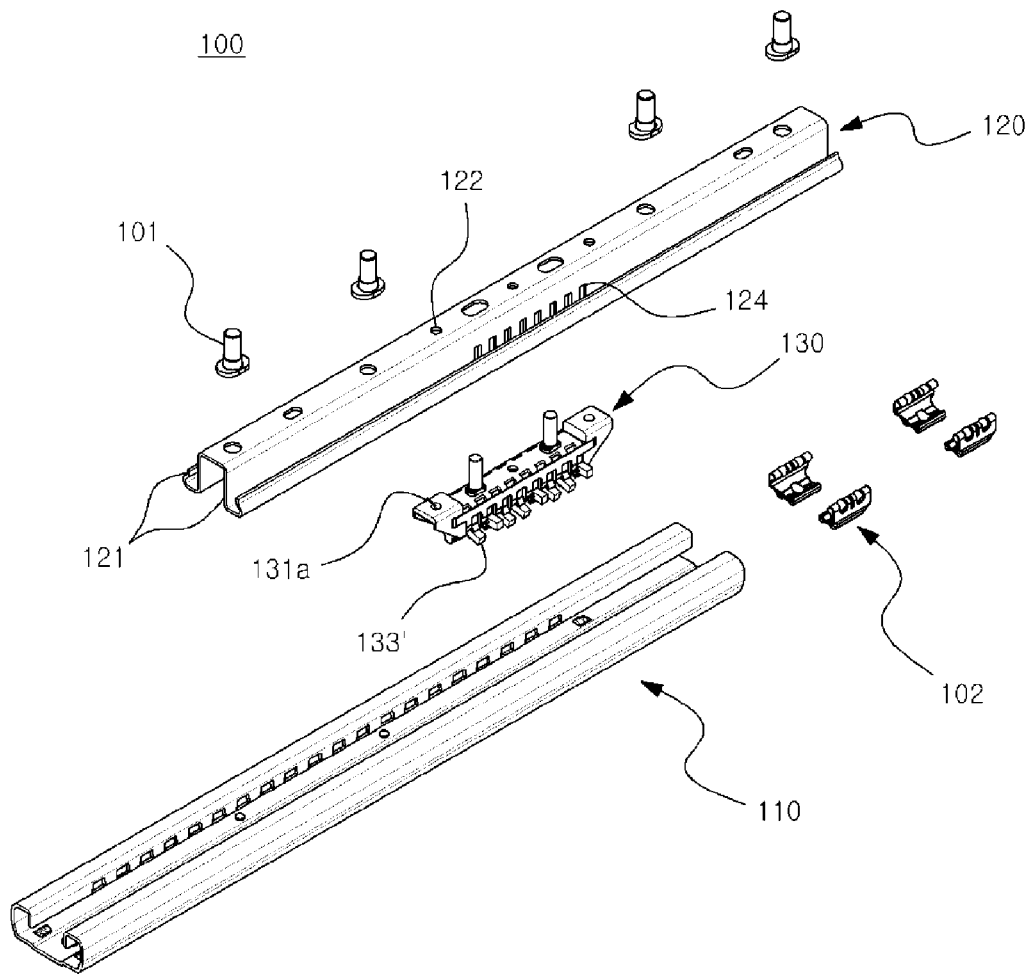
FIG. 3 is an exploded perspective view the seat track of FIG. 1.

Also, the seat track 100 comprises a locking member 130 shown in FIG. 3 as means for locking and unlocking a slide of the moving rail 120 with regard to the fixed rail 110.

In FIG. 3, the numeral 102 indicates a ball bearing and a bearing holder which are disposed between the fixed rail 110 and the moving rail 120 when the rails 110, 120 are combined.

The fixed rail 110 has at laterally inner walls 112 extending vertically a number of recesses 112 which are provided with a predetermined pitch therebetween in the longitudinal direction. The recesses 112 are formed to correspond laterally between the inner walls 112.

The moving rail 120 is coupled to the fixed rail 110 at the inner side of the fixed rail 110 to slide longitudinally so that the laterally vertical walls 121 face laterally inner walls 111 of the fixed rail 110.

As shown in FIG. 3, each vertical wall 121 has at its longitudinally center part a plurality of through holes 124 formed at a predetermined interval therebetween.

As will be described later, rotating pins 133' of the locking member 130 protrude through the through holes 124 to be inserted into the recesses 112 of the fixed rail 110.

Figure 4:
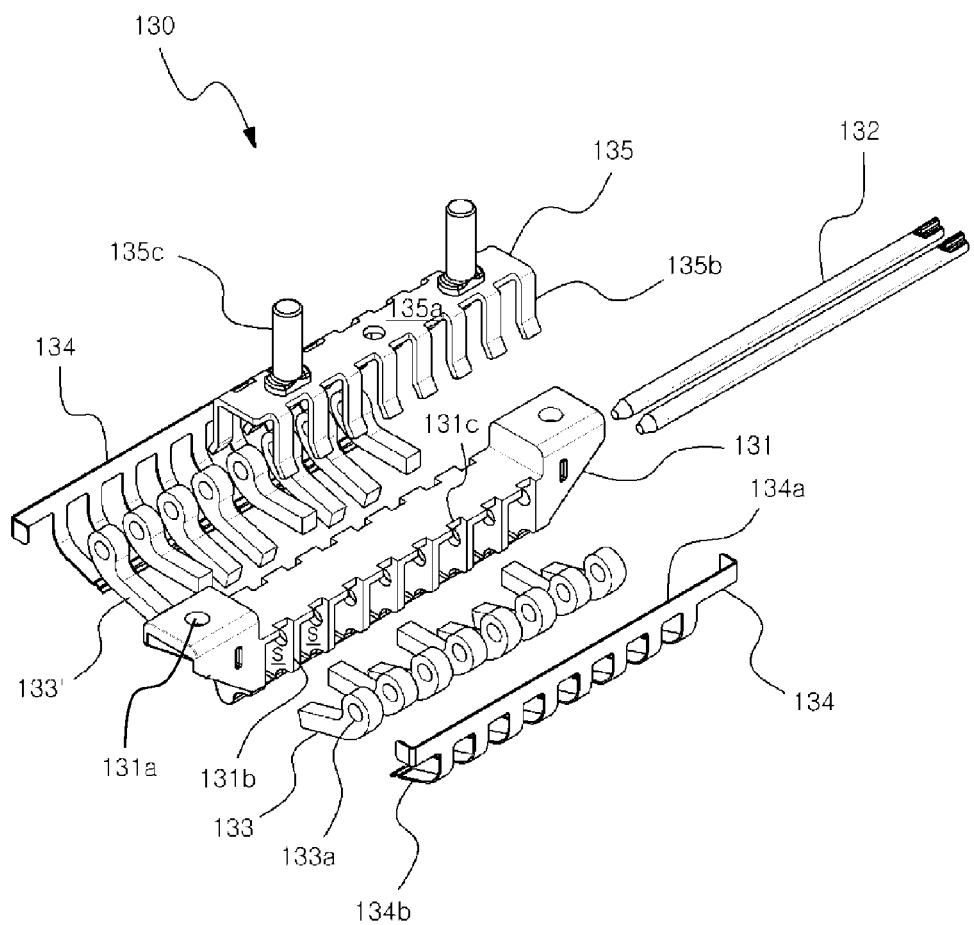
FIG. 4 is an exploded perspective view of the locking member in the seat track of FIG. 3.

As shown in FIG. 4, the locking member 130 has a supporting body 131, a plurality of the rotating pins 133 penetrated and rotatably supported by a hinge shaft 132 which is inserted into the supporting body 131, a guide spring 134 elastically pressing the rotating pins 133, and an unlocking body 135 guided by the supporting body 131 in a vertical direction to operate the rotating pins 133 to rotate.

The supporting body 131 is received between the laterally vertical walls 121 (refer to FIG. 3) of the moving rail 120 and it is installed and fixed at an inside of the moving rail 120 by combining combining holes 131a formed on an upper surface at both ends thereof to combining holes 122 of the moving rail 120.

Each of the rotating pins 133 has a pin hole 133a at its end part. The hinge shaft 132 is inserted into the pin hole 133a, so that each rotating pin 133 can rotate freely around the hinge shaft 132.

In the seat track 100 according to this embodiment of the present invention, a plurality of the rotating pins 133 are provided eight pieces per each lateral side to rotate with regard to the supporting body 131 in the opposite directions therebetween.

In this case, the left rotating pins 133' and the right rotating pins 133 are arrayed alternately therebetween along the longitudinal direction of the supporting body 131. That is, the relation where the left rotating pin 133' is located at the front (left in FIG. 4) and the right rotating pin 133 is located next to it is maintained throughout the whole rotating pins 133 and 133'.

In this embodiment, a plurality of chamber walls 131b are formed in the supporting body 131 along its longitudinal direction.

The left rotating pin 133' and the right rotating pin 133 are received in a pair in each of eight compartments S formed by the chamber walls 131b.

This structure where the left and the right rotating pins 133 and 133' are faced to each other and received in a pair can contribute to a decrease of the minimum slide interval, that is pitch, to lock the moving rail 120 with regard to the fixed rail 110.

If the pitch becomes smaller, the seat integrally slid with the moving rail 120 can be fixed nearer to the position the user wants.

The guide spring 134 has a guide body 134a of a shape of a stripe extending along a lateral surface of the supporting body 131. The guide body 134a is inserted in a slit 131a of the supporting body 131. A plurality of spring arms 134b extending from the guide body 134a elastically press the rotating pins 133 upwardly.

Accordingly, the rotating pins 133 are maintained to be rotated upwardly by the spring arms 134b if there is no outer force.

The unlocking body 135 has a surface plate 135a extending in the longitudinal direction of the supporting body 131 and eight push arms 135b extending downwardly from both lateral side of the surface plate 135a.

In this case, the push arms 135b of both lateral sides protrude to cross paths therebetween in order to correspond one to one to each of the rotating pins 133, 133'.

The unlocking body 135 slides up and down while a plurality of the push arms 135b are guided by a plurality of guiding recesses 131c which are formed at both lateral sides of the supporting body 131.

An input pin 135c is coupled onto the surface plate 135a of the unlocking body 135 to protrude to an outside through an opening 123 of the moving rail 120 (refer to FIG. 1).

Hereinafter, the operation of the seat track 100 as described above is described.

Figure 5:
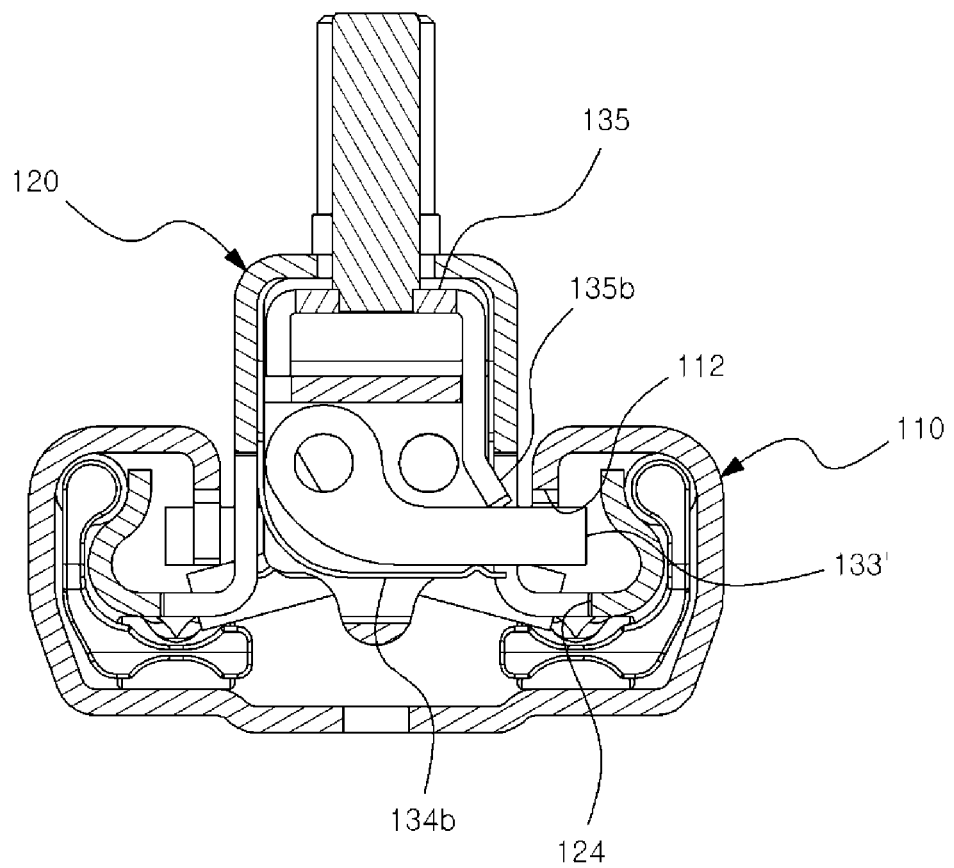
FIG. 5 and FIG. 6 are imaginary sectional views along AA line of the seat track of FIG. 2 and show a locking state and an unlocking state respectively.
Figure 6:
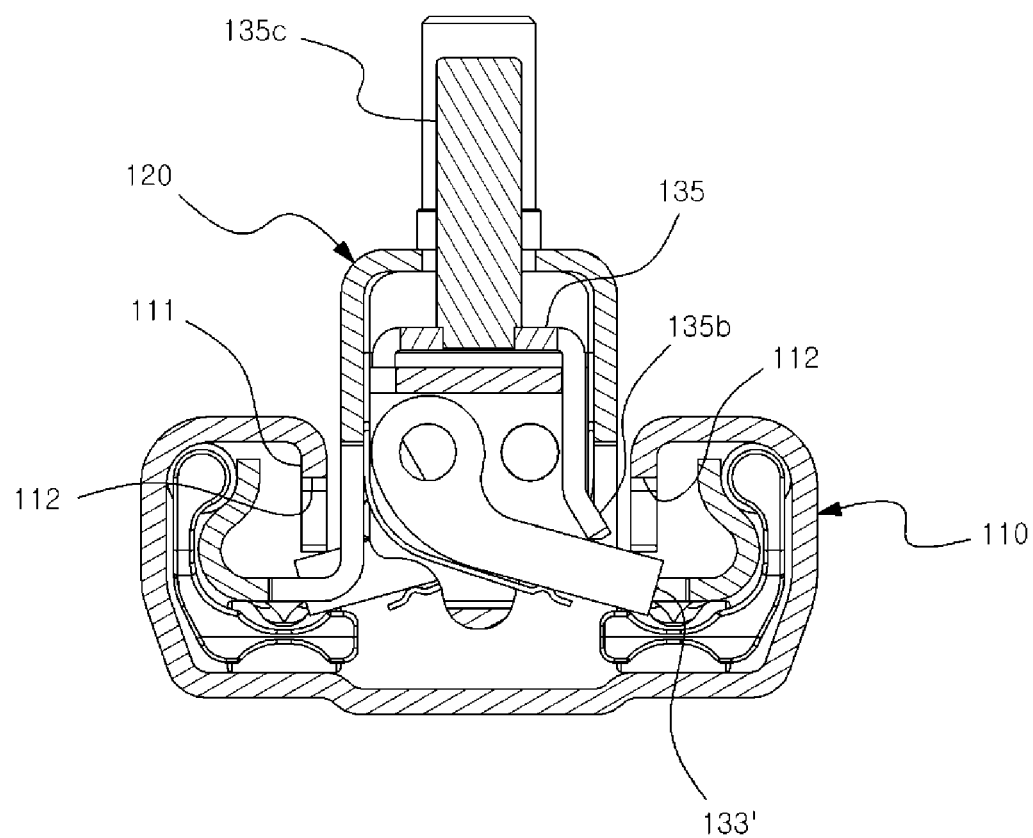

FIG. 5 and FIG. 6 are imaginary sectional views of the seat track 100 along line AA in FIG. 2. FIG. 5 shows the rotating pin 133' located at a locking position and FIG. 6 shows the rotating pin 133' at an unlocking position.

Referring to FIG. 5 and FIG. 6, the locking member 130 according to this exemplary embodiment of the present invention is disposed within the moving rail 120 except a part of the rotating pins 133, 133'.

To describe the locking state of FIG. 5, the rotating pin 133', which is not pressed downwardly by the push arm 135b of the unlocking body 135, is elastically pressed upwardly by the spring arm 134b of the guide spring to be maintained rotated counterclockwise to a locking position.

Accordingly, the rotating pin 133' protrudes through the through hole 124 of the moving rail 120 to be inserted into the recess 112 of the fixed rail 110 so that the moving rail 120 is in the locking state with regard to the fixed rail 110.

FIG. 6 shows an unlocking state. If the unlocking body 135 is lowered by an outer force through the input pin 135c, the rotating pin 133' is maintained rotated clockwise to an unlocking position due to the pressure of the push arm 135b.

Accordingly, the rotating pin 133' is rotated and separated from the recess 112 of the fixed rail 110, so that the moving rail 120 is in the unlocking state with regard to the fixed rail 110.

As described above, the seat track 100 according to this exemplary embodiment of the present invention comprises a plurality of the chamber walls 131b in the supporting body 131 (refer to FIG. 4) and a pair of the left and the right rotating pins 133 and 133' are received for each chamber wall 131b.

According to this disposition structure of the rotating pins 133 and 133', the left rotating pin 133' and the right rotating pin 133 are located within the same chamber wall 131b to contact surface to surface therebetween. That is, as shown in FIG. 7, both pin 133' and 133 within the same chamber wall are located very close to each other in the longitudinal direction while they operate with the recess 112 of the fixed rail 110.

Figure 7:
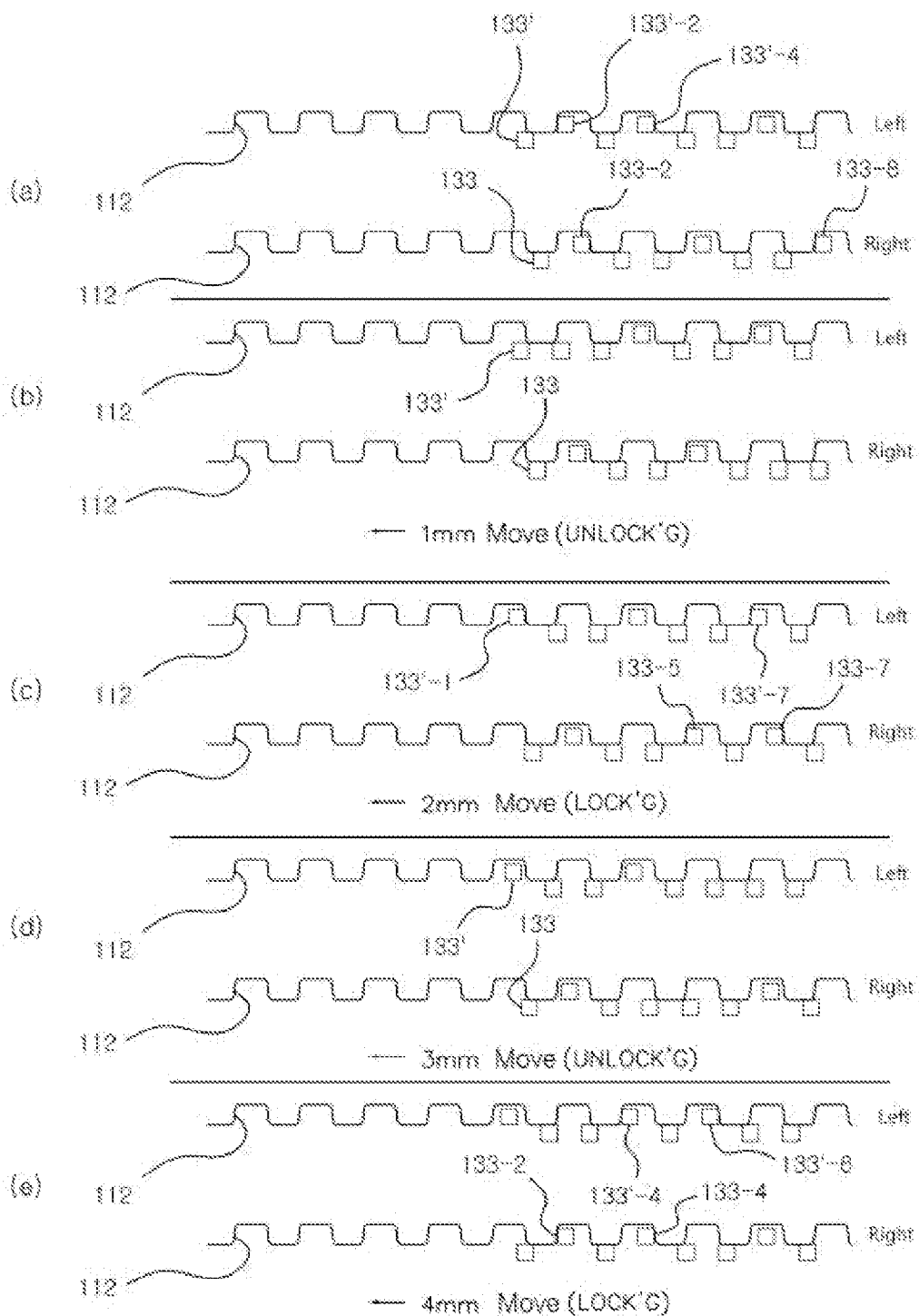
FIG. 7 is a schematic view showing a locking process where the locking member is locked to the fixed rail according to a detail movement of the moving rail in the seat track of FIG. 1.

In FIG. 7 (a), two left rotating pins 133'-2 and 133'-4 contact the front and rear surfaces of the recesses 112 to make locking, and two right rotating pins 133-2 and 133-8 contact the front and rear surfaces of the recesses 112 to make locking. Therefore, the moving rail 120 is locked with regard to the fixed rail 110.

If the moving rail 120 is disposed to the left, the rotating pins 133 and 133' moves integrally to the left as shown in FIG. 7 (b). in this condition, Either of the left and the right rotating pins 133, 133' does not contact the front or the rear surface of the recess 112 thus making the unlocking sate.

If the rotating pins 133 and 133' mover further to the left as shown in FIG. 7 (c), two left rotating pins 133'-1 and 133'-7 contact the front and rear surfaces of the recesses 112 to make locking, two right rotating pins 133-5 and 133-7 contact the front and rear surfaces of the recesses 112 to make locking. Therefore, the moving rail 120 is locked with regard to the fixed rail 110.

If the rotating pins 133 and 133' mover further to the left as shown in FIG. 7 (d), either of the left and the right rotating pins 133, 133' does not contact the front or the rear surface of the recess 112 thus making the unlocking sate.

If the rotating pins 133 and 133' mover even further to the left as shown in FIG. 7 (e), two left rotating pins 133'-4 and 133'-6 contact the front and rear surfaces of the recesses 112 to make locking, two right rotating pins 133-2 and 133-4 contact the front and rear surfaces of the recesses 112 to make locking. Therefore, the moving rail 120 is locked with regard to the fixed rail 110.

According to the process as described above, the seat track 100 of this exemplary embodiment of the present invention has the moving rail 120 whose minimum slide interval to make its locking state, that is the pitch, is the same as the distance that the rotating pins 133, 133' have moved from FIG. 7 (a) to FIG. 7 (c) or from FIG. 7 (c) to FIG. 7 (e).

This means that the user of the seat can adjust the longitudinal position of the seat per the interval from FIG. 7 (a) to FIG. 7 (c) or from FIG. 7 (c) to FIG. 7 (e), which also means the positional adjustment can be made per quite smaller interval compared to the conventional art.

Furthermore, even the states shown in FIG. 7 (b) and (d) can be regarded as the locking state between the rails 110 and 120 because at least some of the rotating pins 133, 133' exist within the recesses 112 while they are movable a little back and forth. That is, according to the present invention, even if there is a gap between the recesses 112 and the rotating pins 133, 133' inserted therein, at least a fully unlocking sate where completely no rotating pins 133, 133' are inserted into the recesses 112 can be prevented. Therefore, the moving rail 120 is prevented from sliding due to an outer force.

Although the seat track 100 according to the exemplary embodiment of the present invention has been disclosed, various modifications, additions and substitutions are possible, without departing from the scope and spirit of the invention. Therefore, the above embodiment must be regarded as one example provided for description of the present invention, rather than to limit the present invention.

The invention claimed is:
1. A seat track comprising:
a fixed rail of a channel structure having laterally inner walls which extend vertically and have recesses with a predetermined interval in a longitudinal direction;
a moving rail sliding along the fixed rail and having laterally vertical walls which face the inner walls of the fixed rail and have a plurality of through holes with a predetermined interval in the longitudinal direction; and
a locking member having a supporting body received and installed between the vertical walls of the moving rail to face a plurality of the through holes, a plurality of rotating pins supported by the supporting body and rotating between a locking position where a plurality of the rotating pins are inserted in the recesses of the fixed rail through the through holes and an unlocking position where a plurality of the rotating pins are separated from the recesses, a guide spring supported by the supporting body and pressing a plurality of the rotating pins to rotate toward the unlocking locking position, and an unlocking body sliding along the supporting body due to an outer force to press a plurality of the rotating pins to rotate from the locking position to the position, wherein a plurality of the rotating pins are provided as a pair at both lateral sides and supported by the supporting body to rotate in the opposite directions therebetween, and also provided to be inserted into the recesses of the inner walls of the fixed rail through the through holes of the vertical walls of the moving rail.

2. The seat track according to claim 1, wherein a plurality of the rotating pins which are provided as a pair at both lateral sides are penetrated and supported to rotate by a pair of hinge shaft inserted in the supporting body in the longitudinal direction.

3. The seat track according to claim 1, wherein the unlocking body has a plurality of push arms in a pair at both lateral sides to correspond to each of a plurality of the rotating pins, and
the supporting body has a plurality of guiding recesses at both lateral sides to guide the slide of a plurality of the push arms.

4. The seat track according to claim 3, wherein the unlocking body has a surface plate received between the vertical walls of the moving rail as well as above the supporting body and integrally formed with a plurality of the push arms, and an input pin mounted on the surface plate to protrude to an outside through an upper surface of the moving rail.

5. The seat track according to claim 1, wherein a plurality of the rotating pins are arrayed alternately along the longitudinal direction of the supporting body therebetween at both lateral sides, and
the supporting body has a plurality of chamber walls to receive a plurality of the rotating pins per two rotating pins from different lateral sides therebetween in the longitudinal direction.

6. The seat track according to claim 1, wherein the guide spring has a guide body of a strip shape extending along a side surface of the supporting body, and a plurality of spring arms extending from the guide body to press a plurality of the rotating pins respectively.

\* \* \* \* \*